(12) United States Patent
Liu et al.

(10) Patent No.: US 10,984,238 B2
(45) Date of Patent: Apr. 20, 2021

(54) SEMI-SUPERVISED AUTOMATIC MARKING METHOD AND DEVICE FOR GROUND-OBJECT IN HYPERSPECTRAL IMAGE

(71) Applicant: China University of Petroleum (East China), Qingdao (CN)

(72) Inventors: Xin Liu, Qingdao (CN); Yuqiang Sun, Qingdao (CN); Guangbo Ren, Qingdao (CN); Yabin Hu, Qingdao (CN); Hongzhan Sun, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 16/743,579

(22) Filed: Jan. 15, 2020

(65) Prior Publication Data
US 2020/0327325 A1 Oct. 15, 2020

(30) Foreign Application Priority Data

Apr. 15, 2019 (CN) .......................... 201910297181.1

(51) Int. Cl.
*G06K 9/00* (2006.01)
*G06K 9/52* (2006.01)
*G06K 9/62* (2006.01)

(52) U.S. Cl.
CPC ..... *G06K 9/00651* (2013.01); *G06K 9/00993* (2013.01); *G06K 9/52* (2013.01); *G06K 9/6219* (2013.01); *G06K 9/6263* (2013.01); *G06K 2009/00644* (2013.01)

(58) Field of Classification Search
CPC .. G06K 9/6202; G06K 9/6221; G06K 9/6255; G01N 2021/1797
See application file for complete search history.

(56) References Cited

U.S. PATENT DOCUMENTS

| | | | | |
|---|---|---|---|---|
| 7,479,967 B2* | 1/2009 | Bachelder | ............. | G06T 19/003 345/592 |
| 8,310,554 B2* | 11/2012 | Aggarwal | ............. | G01S 3/7864 348/211.11 |

(Continued)

*Primary Examiner* — Yosef Kassa
(74) *Attorney, Agent, or Firm* — Flener IP & Business Law; Zareefa B. Flener

(57) ABSTRACT

The embodiment of the present invention provides a semi-supervised automatic marking method for spartina alterniflora in a hyperspectral image. According to the semi-supervised automatic marking method for spartina alterniflora in a hyperspectral image provided by the present invention, based on the dimensionality reduction on 108-dimensional data of 18 wave bands, unsupervised clustering is performed by the fast clustering algorithm based on the local density, and then the clustering result is matched with a marked spartina alterniflora data set, so that completely automatic marking of the data is realized, and automatic marking for spartina alterniflora is realized. The embodiment of the present invention also provides a semi-supervised automatic marking device for spartina alterniflora in a hyperspectral image. Through the technical scheme provided by the embodiment of the present invention, recognition and marking for spartina alterniflora can be realized accurately and effectively.

5 Claims, 2 Drawing Sheets

(56) References Cited

U.S. PATENT DOCUMENTS

| | | | | |
|---|---|---|---|---|
| 8,774,529 | B2* | 7/2014 | Rubenstein | G06K 9/0063 |
| | | | | 382/218 |
| 9,001,226 | B1* | 4/2015 | Ng | H04N 5/23203 |
| | | | | 348/211.11 |
| 9,035,710 | B2* | 5/2015 | Michiyoshi | H03K 7/08 |
| | | | | 332/109 |
| 9,078,619 | B2* | 7/2015 | Panasyuk | A61B 5/0261 |

* cited by examiner

SEMI-SUPERVISED AUTOMATIC MARKING METHOD AND DEVICE FOR GROUND-OBJECT IN HYPERSPECTRAL IMAGE

CROSS-REFERENCE TO RELATED APPLICATION

This application claims priority to Chinese Patent Application No. 201910297181.1 filed on Apr. 15, 2019, the disclosure of which is incorporated by reference herein in its entirety.

TECHNICAL FIELD

The present invention relates to a semi-supervised automatic marking method, in particular to a semi-supervised automatic marking method for hyperspectral image data and a semi-supervised automatic marking device for hyperspectral image data.

BACKGROUND

Images of an optical camera or hyperspectral imaging are recognized by human eyes for judgment after on-the-spot investigation of ground-object recognition and marking generally, and manual marking is carried out after manual recognition, the way is low in efficiency and high in cost, some areas cannot be investigated on the spot, and the requirement of regional wide-range ground-object recognition is difficult to meet. Therefore, a hot issue worthy of research is how to automatically recognize and mark ground-objects in hyperspectral images.

For high-dimensionality complex hyperspectral image data, the traditional research mainly adopts principal component analysis which is a basic linear dimensionality reduction method. An original sample is reconstructed by finding out a group of optimal linear combinations by linear transformation, which reduces the wave bands correlation of original hyperspectral image data, so the ground-object recognition and marking precision of hyperspectral image data are improved to a certain extent, but minor-target ground-objects in original hyperspectral images are easily ignored through the linear transformation, and a great deal of non-linear relationship data exists in the hyperspectral image data. Dimensionality reduction is carried out by some scholars on the hyperspectral image data by using a non-linear dimensionality reduction method based on local linear embedding, an internal manifold structure is disclosed by using the local geometric structure of a hyperspectral data set and discover the intrinsic main variables. While the manifold dimension reduction algorithm only processes the data from the geometry of the data itself, and does not take into account the physical characteristics of the hyperspectral image dataset.

Aiming at the classification problem of ground-objects in hyperspectral images, supervised classification methods such as decision trees and support vector machines are adopted in traditional classification ways, although the classification effect is good, the supervised classification methods need a great number of samples with marks, and collecting labeled samples is a matter of consuming an army of manpower, material resources and financial resources. Some scholars use the Transductive Support Vector Machine for classification, which is a decision-making boundary is trained via insignificant number of labeled samples, the boundary is adjusted by using unlabeled data, but the non-convexity of the loss function can lead to local optimization.

Aiming at the marking problem of ground-objects in hyperspectral images, some scholars use a ground-object recognition classification in combined with ground-object space geographic position and decision trees, a large number of marked ground-object samples are needed, in combination with a great deal of manual analysis, recognition and manual marking operation, thick line marks in related geographic regions do not reach the pixel level of ground-object accurate recognition on the hyperspectral images.

Aiming at the above problems, a t-SNE dimensionality reduction algorithm is adopted for the hyperspectral image data, all features of original hyperspectral image data are maintained, and the features of major variables in the hyperspectral image data also can be extracted. The unsupervised fast clustering algorithm based on local density is used to automatically cluster the unmarked data after the dimension reduction, which is a decision boundary is not needed, and reduces a lot of sample tag acquisition and analysis. The MATLAB matrix transformation operation is used to map the clustering results to the original hyperspectral image, which reduces a lot of manual work, realizes automatic pixel-level marking of ground-objects, and improves the accuracy of ground-objects marking.

Above all, based on the problems existing in the research, a semi-supervised automatic labeling method for hyperspectral image is provided for CHRIS satellite hyperspectral image data containing a small amount of marked data. After the dimensionality reduction feature fusion is carried out on original high-dimensionality complex hyperspectral image data by using the t-SNE dimensionality reduction algorithm, the unsupervised fast clustering algorithm based on local density is used to automatically cluster the unmarked data after the dimension reduction, and then the marked ground-object data is matched with each class of data, clustering parameters is adjusted so as to amend the accuracy of classification. The MATLAB matrix transformation operation is used to map the clustering results onto the original hyperspectral image, which reduces a lot of manual work, realizes automatic pixel-level marking of ground-objects, and improves the accuracy of ground-objects marking.

SUMMARY

In order to solve the problems in the prior art, the present invention provides a semi-supervised automatic marking method for hyperspectral image data. In the semi-supervised automatic marking method for hyperspectral image data, aiming at 108-dimensional data of 18 wave bands containing a small number of ground-object marks, after feature fusion by data dimensionality reduction, preliminary classification is carried out on each ground-object by using unsupervised clustering, and then marked ground-object data is matched with each class of data, clustering parameters are adjusted so as to amend the accuracy of classification. MATLAB matrix transformation operation is carried out on final classification results which are mapped to the pixel coordinates of spectral images to realize automatic marking for each class of ground-objects.

The present invention adopts the following technical solution.

A semi-supervised automatic marking method for ground-objects in a hyperspectral image includes the following steps:

A. reducing 108-dimensional data into two-dimensional data by using a t-SNE dimensionality reduction method and fusing the features reflected by the 108-dimensional data into two-dimensional data, where the characteristics of each ground-object is reflected in 108-dimensional data of 18 bands in the Yellow River mouth hyperspectral image data collected by CHRIS satellite;

B. using the unsupervised clustering algorithm, namely a quick clustering algorithm based on local density for combining the data with the same characteristics into one class, to automatically cluster the dimensionality-reduced two-dimensional data, and clustering yellow river estuary data which contain various ground objects into multiple classes;

C. matching each class of data with marked data; if the marked data of each ground-object does not belong to the same class, resetting clustering parameters, and continuously clustering until the marked data of each ground-object belongs to the same class of clustering results;

D. finding out the corresponding yellow river estuary image pixel coordinates of the data containing each class of marked data through MATLAB matrix transformation operation, and carrying out completely automatic marking on each class of ground-objects.

In step B, the multiple classes of data indicate several data sets with relatively high difference which are automatically divided from CHRIS hyperspectral image data through the unsupervised quick clustering algorithm. At this time, the multiple classes of data may belong to the same ground-object, and one class of data is possibly composed of various ground-object data.

In step C, the step of adjusting clustering parameters refers to adjusting the shortest distance and the minimum number of points.

In step D, the MATLAB matrix operation refers to matrix data are mapped into CHRIS hyperspectral images.

A semi-supervised automatic marking device for ground-objects in a hyperspectral image includes a CHRIS hyperspectral image data dimensionality reduction module, an unsupervised clustering module, a marked cluster matching module, and an automatic marking module for ground-object.

The CHRIS hyperspectral image data dimensionality reduction module is used for reducing 108-dimensional data into two-dimensional data by using a t-SNE dimensionality reduction method and fusing the features reflected by the 108-dimensional data into two-dimensional data, where the characteristics of each ground-object is reflected in 108-dimensional data of 18 bands in the Yellow River mouth hyperspectral image data collected by CHRIS satellite.

The unsupervised clustering algorithm uses a quick clustering algorithm based on local density for combining the data with the same characteristics into one class, to automatically cluster the dimensionality-reduced two-dimensional data, and clustering yellow river estuary data which contain various ground objects into multiple classes.

The marked cluster matching module is used for matching each class of data with marked data. If the marked data of each ground-object does not belong to the same class, reset clustering parameters, and the step of adjusting clustering parameters refers to adjusting the sizes of parameters with the shortest distance and the minimum number of points, and continuously cluster until the marked data of each ground-object belongs to the same class of clustering results;

The automatic marking module for ground-object is used for finding out the corresponding yellow river estuary image pixel coordinates of the data containing each class of marked data through MATLAB matrix transformation operation, and carrying out completely automatic marking on each class of ground-objects.

The technical scheme provided by the present invention and the semi-supervised automatic marking device for hyperspectral image data has the following beneficial effects:

In the semi-supervised automatic marking method for hyperspectral image data, with regard to 108-dimensional data of 18 wave bands containing a small number of ground-object marks, after feature fusion by data dimensionality reduction, preliminary classification is carried out on each ground-object by using unsupervised clustering, and then marked ground-object data is matched with each class of data; clustering parameters are adjusted so as to amend the accuracy of classification. MATLAB matrix transformation operation is carried out on final classification results which is mapped to the pixel coordinates of spectral images to realize automatic marking for each class of ground-objects.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
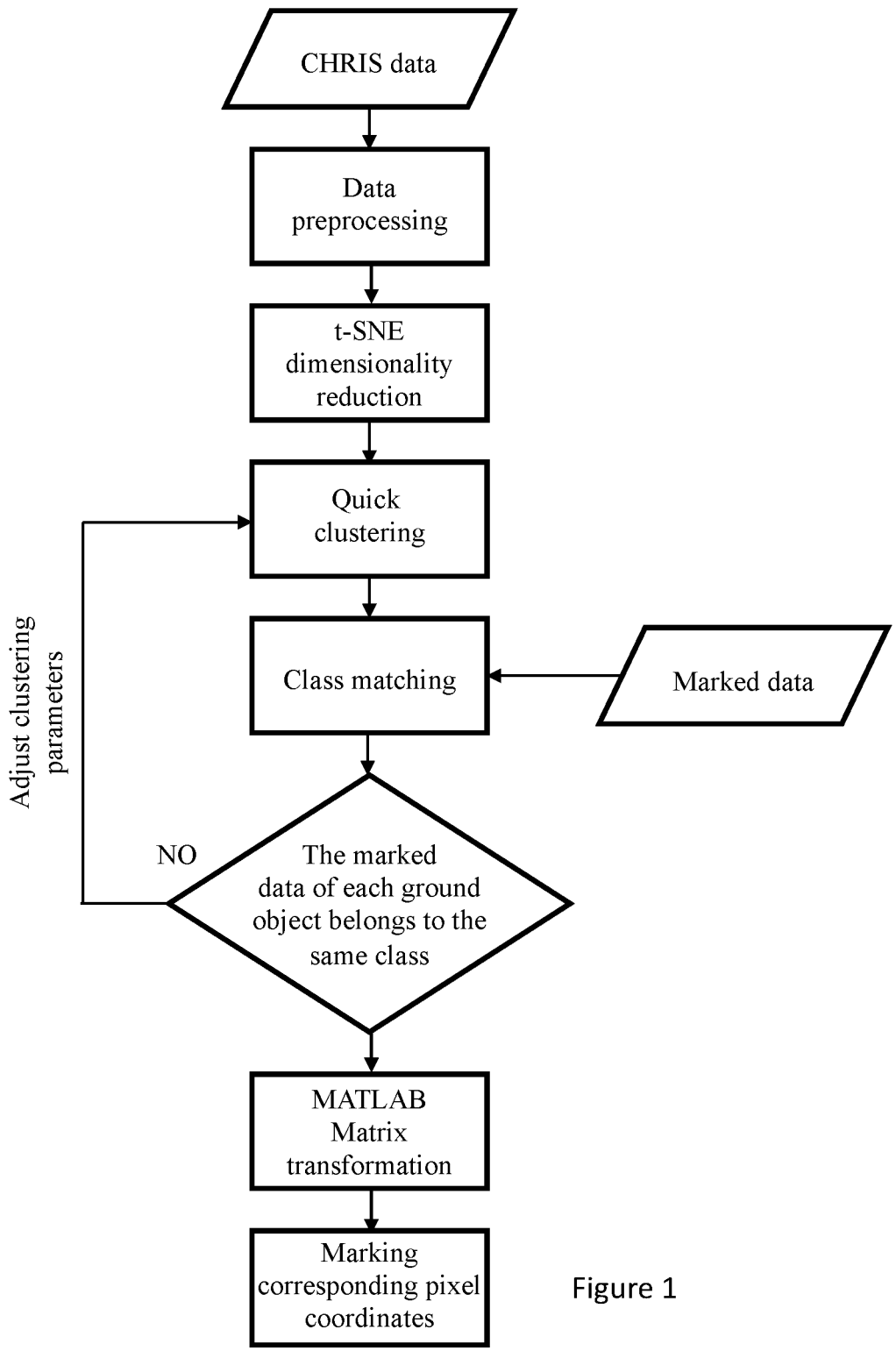
FIG. 1 is an implementation flow chart of a semi-supervised automatic marking algorithm for spartina alterniflora.
Figure 2:
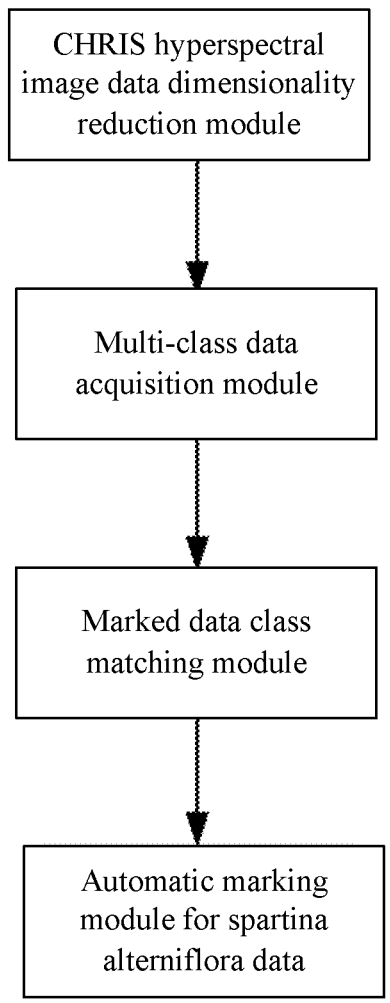
FIG. 2 is a structure diagram of a semi-supervised automatic marking device for spartina alterniflora provided by the embodiment of the present invention.

In order to make the purpose, technical scheme and advantages of the present invention more clear, the technical scheme of the present invention is described in detail as follows in conjunction with the attached drawings:

Embodiment 1

The foundation of the embodiment lies in that due to fact that other plants such as spartina alterniflora and reeds are mixed in acquired yellow river estuary hyperspectral image data collected by a CHRIS satellite in 2016, a small number of spartina alterniflora and reeds are marked manually, and the marked data occupies 7.9% of total data size, in order to automatically mark all the spartina alterniflora, 108-dimensional data is reduced into two-dimensional data by using a t-SNE dimensionality reduction method, a quick clustering algorithm based on local density is used to automatically cluster the dimensionality-reduced two-dimensional data; marked data is matched with classified data, if the marked data does not belong to the same class, resetting clustering parameters, and continuously clustering until the marked data of each ground-object belongs to the same class of clustering results. The class of data is completely automatically marked, automatic marking for spartina alterniflora is realized, and the two-dimensional data fusing the features reflected by the 108-dimensional data into two-dimensional data.

On the basis of the acquired two-dimensional data, a quick clustering algorithm based on local density is used to automatically cluster the dimensionality-reduced two-dimensional data. The algorithm combines the data with the same characteristics into one class, and cluster yellow river estuary data which contain various ground objects into multiple classes.

Each class of data is matched with marked data. If the marked data of each ground-object does not belong to the same class, resetting clustering parameters, the step of adjusting clustering parameters refers to adjusting the sizes of parameters with the shortest distance and the minimum number of points, and continuously clustering until the marked data of each ground-object belongs to the same class of clustering results.

The corresponding yellow river estuary image pixel coordinates of the data containing each class of marked is found out through MATLAB matrix transformation operation, and completely automatic marking is carried out on each class of ground-objects.

What is claimed is:

1. A semi-supervised automatic marking method for ground-objects in a hyperspectral image, comprising the following steps:
   A. reducing 108-dimensional data into two-dimensional data by using a t-SNE dimensionality reduction method and fusing the features reflected by the 108-dimensional data into two-dimensional data, wherein the characteristics of each ground-object is reflected in 108-dimensional data of 18 bands in the Yellow River mouth hyperspectral image data collected by CHRIS satellite;
   B. using the unsupervised clustering algorithm, namely a quick clustering algorithm based on local density for combining the data with the same characteristics into one class, to automatically cluster the dimensionality-reduced two-dimensional data, and clustering yellow river estuary data which contain various ground objects into multiple classes;
   C. matching each class of data with marked data; if the marked data of each ground-object does not belong to the same class, resetting clustering parameters, and continuously clustering until the marked data of each ground-object belongs to the same class of clustering results;
   D. finding out the corresponding yellow river estuary image pixel coordinates of the data containing each class of marked data through MATLAB matrix transformation operation, and carrying out completely automatic marking on each class of ground-objects.

2. The semi-supervised automatic marking method for ground-objects in a hyperspectral image according to claim 1, wherein, in step B, the multiple classes of data indicate several data sets with relatively high difference which are automatically divided from CHRIS hyperspectral image data through the unsupervised quick clustering algorithm at this time, the multiple classes of data may belong to the same ground-object, and one class of data is possibly composed of various ground-object data.

3. The semi-supervised automatic marking method for ground-objects in a hyperspectral image according to claim 1, wherein, in step C, the step of adjusting clustering parameters refers to adjusting the shortest distance and the minimum number of points.

4. The semi-supervised automatic marking method for ground-objects in a hyperspectral image according to claim 1, wherein, in step D, the MATLAB matrix operation refers to matrix data are mapped into CHRIS hyperspectral images.

5. A semi-supervised automatic marking device for ground-objects in a hyperspectral image, comprising a CHRIS hyperspectral image data dimensionality reduction module, an unsupervised clustering module, a marked cluster matching module, and an automatic marking module for ground-object; wherein
   the CHRIS hyperspectral image data dimensionality reduction module is used for reducing 108-dimensional data into two-dimensional data by using a t-SNE dimensionality reduction method and fusing the features reflected by the 108-dimensional data into two-dimensional data, where the characteristics of each ground-object is reflected in 108-dimensional data of 18 bands in the Yellow River mouth hyperspectral image data collected by CHRIS satellite;
   the unsupervised clustering algorithm uses a quick clustering algorithm based on local density for combining the data with the same characteristics into one class, to automatically cluster the dimensionality-reduced two-dimensional data, and clustering yellow river estuary data which contain various ground objects into multiple classes;
   the marked cluster matching module is used for matching each class of data with marked data If the marked data of each ground-object does not belong to the same class, reset clustering parameters, and the step of adjusting clustering parameters refers to adjusting the sizes of parameters with the shortest distance and the minimum number of points, and continuously cluster until the marked data of each ground-object belongs to the same class of clustering results;
   the automatic marking module for ground-object is used for finding out the corresponding yellow river estuary image pixel coordinates of the data containing each class of marked data through MATLAB matrix transformation operation, and carrying out completely automatic marking on each class of ground-objects.

* * * * *